United States Patent
Hermel

(10) Patent No.: US 11,713,077 B2
(45) Date of Patent: Aug. 1, 2023

(54) SYSTEMS AND METHODS FOR ELECTRIC TRACK VEHICLE CONTROL

(71) Applicant: Vortrex LLC, Waseca, MN (US)

(72) Inventor: Michael J. Hermel, Waseca, MN (US)

(73) Assignee: Vortrex LLC, Waseca, MN (US)

( * ) Notice: Subject to any disclaimer, the term of this patent is extended or adjusted under 35 U.S.C. 154(b) by 195 days.

(21) Appl. No.: 17/199,194

(22) Filed: Mar. 11, 2021

(65) Prior Publication Data

US 2022/0289294 A1  Sep. 15, 2022

(51) Int. Cl.
*B62D 15/02* (2006.01)
*B62D 5/04* (2006.01)

(52) U.S. Cl.
CPC ......... *B62D 15/0235* (2013.01); *B62D 5/046* (2013.01); *B62D 5/0487* (2013.01)

(58) Field of Classification Search
CPC .. B62D 15/0235; B62D 5/046; B62D 5/0487; B62D 11/04; B62D 11/003
See application file for complete search history.

(56) References Cited

U.S. PATENT DOCUMENTS

| | | |
|---|---|---|
| 3,966,005 A | 6/1976 | Binger |
| 4,063,832 A | 12/1977 | Bauer et al. |
| 4,116,298 A | 9/1978 | Hyler |
| 4,122,960 A | 10/1978 | Bauer et al. |
| 4,226,140 A | 10/1980 | Gaasenbeek |
| 4,457,387 A | 7/1984 | Taylor |
| 4,471,669 A | 9/1984 | Seaberg |
| 4,493,385 A | 1/1985 | Shiber |
| 4,639,186 A | 1/1987 | Mellgren |
| 4,682,515 A | 7/1987 | Reed |
| 4,682,912 A | 7/1987 | Henry |

(Continued)

FOREIGN PATENT DOCUMENTS

| | | |
|---|---|---|
| CN | 100395141 C | 6/2008 |
| CN | 100436227 C | 11/2008 |

(Continued)

OTHER PUBLICATIONS

JP2008099346A translate.*

(Continued)

*Primary Examiner* — Tyler J Lee
*Assistant Examiner* — Yufeng Zhang
(74) *Attorney, Agent, or Firm* — Fogg & Powers LLC

(57) ABSTRACT

Systems and methods for track vehicle control are provided. In one embodiment, a method comprises: receiving a steering control signal; inputting a first rotation signal from a first encoder representing a rotational frequency and phase of a first electric motor coupled to a first continuous track mechanism; inputting a second rotation signal from a second encoder representing a rotational frequency and phase of a second electric motor coupled to a second continuous track mechanism; and outputting motor control signals to a first and second motor controllers in response to the steering control signal and differences between the rotational frequency and phase for the first electric motor and the rotational frequency and phase for the second electric motor, wherein the first motor controller is coupled to the first electric motor and the second motor controller is coupled to the second electric motor.

20 Claims, 8 Drawing Sheets

(56) References Cited

U.S. PATENT DOCUMENTS

| | | |
|---|---|---|
| 4,702,843 A | 10/1987 | Oswald et al. |
| 4,705,449 A | 11/1987 | Christianson et al. |
| 4,825,969 A | 5/1989 | King et al. |
| 4,909,341 A | 3/1990 | Rippingale et al. |
| 4,917,200 A | 4/1990 | Lucius |
| 4,942,934 A | 7/1990 | Moriarty |
| 5,016,004 A | 5/1991 | Funk et al. |
| 5,076,377 A | 12/1991 | Frazer |
| 5,113,958 A | 5/1992 | Holden |
| 5,168,946 A | 12/1992 | Dorgan |
| 5,195,600 A | 3/1993 | Dorgan |
| 5,215,403 A | 6/1993 | Peterson |
| 5,228,366 A | 7/1993 | Thoma et al. |
| 6,076,619 A | 6/2000 | Hammer |
| 6,250,409 B1 | 6/2001 | Wells |
| 6,443,254 B1 | 9/2002 | McVaugh |
| 6,454,031 B2 | 9/2002 | Szymkowiak |
| 6,460,640 B1 | 10/2002 | Keagle et al. |
| 6,517,457 B2 | 2/2003 | Schempf et al. |
| 6,571,893 B2 | 6/2003 | De-Noor et al. |
| 6,626,712 B1 | 9/2003 | Bellezza Quater et al. |
| 6,691,795 B2 | 2/2004 | L'Abbe |
| 6,782,969 B2 * | 8/2004 | Kodama ................. B62D 5/046 701/41 |
| 6,837,318 B1 | 1/2005 | Craig et al. |
| 6,953,408 B2 | 10/2005 | Thompson |
| 7,074,151 B2 | 7/2006 | Thompson |
| 7,556,108 B2 | 7/2009 | Won |
| 7,712,555 B2 | 5/2010 | Krieger |
| 7,942,604 B2 | 5/2011 | Willis et al. |
| 7,946,372 B2 | 5/2011 | Shraga et al. |
| 7,954,574 B2 | 6/2011 | Schoon |
| 8,042,628 B2 | 10/2011 | Bordini |
| 8,083,557 B2 | 12/2011 | Sullivan |
| 8,191,290 B2 | 6/2012 | Hughes, IV et al. |
| 8,365,848 B2 | 2/2013 | Won |
| 8,439,152 B2 | 5/2013 | Visscher |
| 8,561,732 B2 | 10/2013 | Schoon |
| 8,565,977 B2 | 10/2013 | Gupta et al. |
| 8,596,051 B2 | 12/2013 | Malaney et al. |
| 8,612,084 B2 | 12/2013 | Hennessy et al. |
| 8,839,891 B2 | 9/2014 | Kaloust et al. |
| 9,008,860 B2 | 4/2015 | Waldock et al. |
| 9,051,718 B2 | 6/2015 | Schmidt |
| 9,132,855 B2 | 9/2015 | Bertsch et al. |
| 9,389,611 B2 | 7/2016 | Erickson et al. |
| 9,567,005 B1 | 2/2017 | Kaloust et al. |
| 9,587,378 B2 | 3/2017 | Schmidt |
| 9,623,903 B2 | 4/2017 | Cook et al. |
| 9,684,308 B2 | 6/2017 | Dahm et al. |
| 9,827,982 B2 | 11/2017 | Owen et al. |
| 9,975,576 B2 | 5/2018 | Flaxman |
| 10,093,355 B1 | 10/2018 | Wang et al. |
| 10,119,246 B2 | 11/2018 | Sewell et al. |
| 10,130,022 B2 | 11/2018 | Blackwell et al. |
| 10,300,783 B2 | 5/2019 | Calleija et al. |
| 10,399,598 B2 | 9/2019 | Tanaka et al. |
| 10,640,146 B2 | 5/2020 | Tanaka et al. |
| 10,661,680 B2 | 5/2020 | Milton et al. |
| 10,731,321 B1 | 8/2020 | Lykken et al. |
| 10,766,530 B2 | 9/2020 | Wang et al. |
| 10,780,917 B2 | 9/2020 | Schaedler et al. |
| 10,822,209 B1 | 11/2020 | Horton |
| 10,836,426 B1 | 11/2020 | Busboom et al. |
| 2004/0002794 A1 | 1/2004 | Pillar et al. |
| 2005/0234622 A1 | 10/2005 | Pillar et al. |
| 2015/0151747 A1 | 6/2015 | Fairgrieve et al. |
| 2016/0272241 A1 | 9/2016 | Sonnenburg et al. |
| 2017/0173484 A1 * | 6/2017 | Wong ................... G05D 1/0011 |
| 2020/0019154 A1 | 1/2020 | Cella et al. |
| 2020/0029490 A1 | 1/2020 | Bertucci et al. |
| 2020/0079228 A1 | 3/2020 | Wright et al. |
| 2021/0067081 A1 * | 3/2021 | Nakazima ............ B62D 5/0487 |

FOREIGN PATENT DOCUMENTS

| | | |
|---|---|---|
| CN | 101716952 B | 5/2012 |
| CN | 104703854 A | 6/2015 |
| CN | 106740273 A | 5/2017 |
| DE | 60314199 | 2/2008 |
| EP | 2657106 B1 | 8/2015 |
| EP | 2657105 B1 | 2/2017 |
| EP | 3210467 B1 | 3/2020 |
| JP | 2008099346 A | 4/2008 |
| JP | 2014069728 A | 4/2014 |
| KR | 100747105 B1 | 8/2007 |
| WO | 2020007835 A1 | 1/2020 |

OTHER PUBLICATIONS

International Searching Authority, "International Search Report and Written Opinion from PCT Application No. PCT/US2022/019282 dated Jun. 24, 2022", from Foreign Counterpart to U.S. Appl. No. 17/199,194, pp. 1 through 12, Published in: KR.

De Novellis et al., "Driving modes for designing the cornering response of fully electric vehicles with multiple motors", Mechanical Systems and Signal Processing 64-65, May 6, 2015, pp. 1 through 15, Elsevier.

De Novellis et al., "Torque Vectoring for Electric Vehicles with Individually Controlled Motors: State-of-the-Art and Future Developments", World Electric Vehicle Journal, EVS26, May 2012, pp. 1 through 12, vol. 5, WEVA.

Odrigo, "Development of Multi-Wheel Drivetrain Control System for Future Electric Combat Vehicle", A Thesis Presented in Partial Fulfillment of the Requirements for the Degree of Master of Applied Science in Automotive Engineering, Apr. 2017, pp. 1 through 175, Faculty of Engineering and Applied Science, University of Ontario Institute of Technology.

* cited by examiner

SYSTEMS AND METHODS FOR ELECTRIC TRACK VEHICLE CONTROL

BACKGROUND

Track vehicle (also commonly referred to as tracked vehicles) are vehicles that utilize a system of propulsion that comprises at least one continuous track running on one or more continuous bands of treads or track plates driven by two or more wheels. The large surface area of the tracks distributes the weight of the vehicle better than traditional tires which better enables track vehicles to traverse soft ground without getting stuck or sinking. A two-track, or dual-track, vehicle is a vehicle that comprises a parallel pair of such continuous tracks positioned on either side of the vehicle. Examples of two-track vehicles include industrial vehicles such as bulldozers.

Typically, when a two track vehicle needs to initiate a turn, it does so by operating each of its two tracks at different speeds which will cause the vehicle to turn in the direction of the slower operating track. That is, if the left track is slower than the right track, then the vehicle will turn to the left. If the right track is slower than the left track, then the vehicle will turn to the right. Consequently, if the vehicle is to travel straight, both tracks should operate at the same speed so that the vehicle is not pulled by the tracks to either the left or the right. One prominent existing method for controlling track vehicles uses open-loop hydrostatic control to change the speed of the tracks. This method adjusts the flow of fluid through two hydraulic motors to control track speed. This system works well at low-speeds. However, any error in the flow of the hydraulic fluids can cause minor speed difference between the two tracks. At highway speeds (for example 30 miles per hour or more) the difference in track speed caused by differences in hydraulic fluid flow is a major issue and the vehicle will tend to constantly pull left or right dependent on which track is operating at the higher speed track. Other two-track vehicles may utilize other control methods that similarly cause unintended speed difference between their two tracks.

For the reasons stated above and for other reasons stated below which will become apparent to those skilled in the art upon reading and understanding the specification, there is a need in the art for systems and methods for electric track vehicle control.

SUMMARY

The Embodiments of the present disclosure provide systems and methods for electric track vehicle control and will be understood by reading and studying the following specification.

In one embodiment, a method for vehicle steering control of a track vehicle comprises: receiving a steering control signal; inputting a first rotation signal from a first rotation encoder representing a rotational frequency and phase of a first electric motor, the first electric motor coupled to a first continuous track mechanism; inputting a second rotation signal from a second rotation encoder representing a rotational frequency and phase of a second electric motor, a second electric motor coupled to a second continuous track mechanism; and outputting motor control signals to a first motor controller and a second motor controller in response to the steering control signal and differences between the rotational frequency and phase for the first electric motor as represented by the first rotation signal and the rotational frequency and phase for the second electric motor as represented by the second rotation signal, wherein the first motor controller is coupled to the first electric motor and the second motor controller is coupled to the second electric motor.

DRAWINGS

Embodiments of the present disclosure can be more easily understood and further advantages and uses thereof more readily apparent, when considered in view of the description of the preferred embodiments and the following figures in which.

In accordance with common practice, the various described features are not drawn to scale but are drawn to emphasize features relevant to the present disclosure. Reference characters denote like elements throughout figures and text.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

Embodiments of the present disclosure introduce closed-loop control systems and methods that monitor differences in the rotation rates associated with the two tracks (in both frequency and phase) and control those rotation rates to effectively minimize errors. When the track vehicle is to travel straight, then difference between measurements of frequency and phase of the two tracks define the errors to be minimized. When the vehicle is executing a turn, then the error between a measured frequency difference and a target frequency defines the error to be minimized. As used herein, minimizing an error can comprise driving the particular error towards zero, or to at least to a value that is less than a predefined error threshold. With the embodiments presented herein, the reflexes of the operator of the track vehicle no longer need to be relied on as the primary error correction mechanism to keep the vehicle going straight or to compensate for vehicle induced oversteering or understeering while turning.

Figure 1:
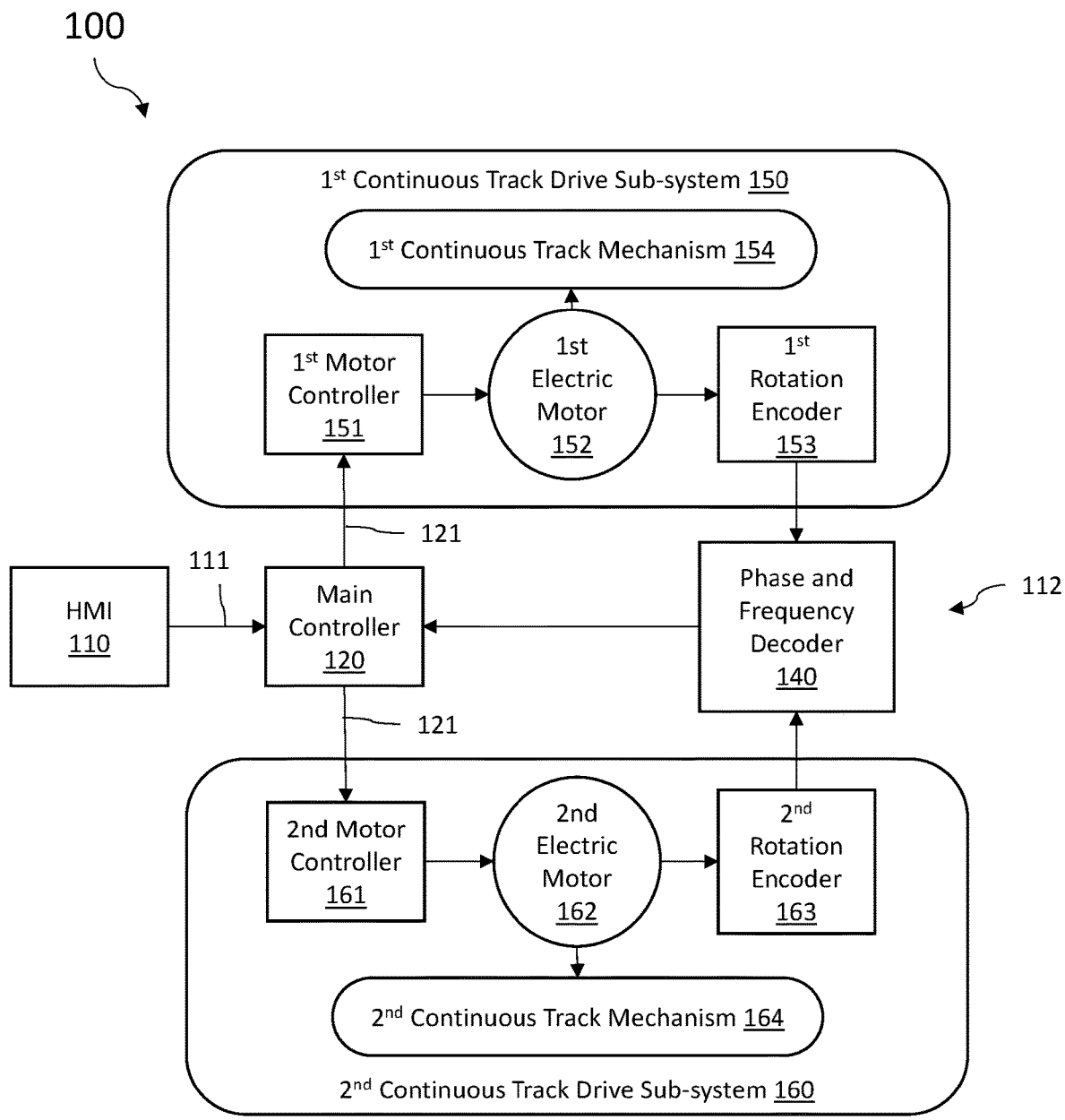
FIG. 1 is a block diagram illustrating an example track vehicle having an example embodiment of a vehicle steering control system.

FIG. 1 is a block diagram illustrating an example track vehicle 100 having an example embodiment of a vehicle steering control system 112. As shown in FIG. 1, the vehicle steering control system 112 of track vehicle 100 comprises a first continuous track drive sub-system 150 and a second continuous track drive sub-system 160. The first and second continuous track drive sub-systems 150, 160 are respectively positioned on the right and left sides of the track vehicle 100 and function as the motive force for propelling the track vehicle 100 and controlling its direction of motion.

The first continuous track drive sub-system 150 includes a first continuous track mechanism 154 that comprises a continuous band (for example, a continuous band of linked treads or track plates) positioned around a set of two or more wheels, and a first electric motor 152 that engages with at least one of the wheels to drive the continuous band. The first continuous track drive sub-system 150 further comprises a first motor controller 151 coupled to the first electric motor 152. The first motor controller 151 provides electric power to the first electric motor 152 and controls the torque, rotational speed, and direction of rotation of the first electric motor 152. The electric motor 152 may go through a specific gear reduction to produce a defined track speed for each rotation. The first continuous track drive system 150 further includes a first rotation encoder 153 coupled to the first electric motor 152. The first rotation encoded 253 measures parameters such as the rotation and rotation rate of the first electric motor 152 and outputs a rotation signal (for example, a complex signal comprising in-phase and quadrature phase components) representing the rotational characteristics of the shaft of the electric motor 152 that drives operation of the first continuous track mechanism 154.

The second continuous track drive sub-system 160 comprises a second continuous track mechanism 164 that comprises a continuous band (for example, a continuous band of linked treads or track plates) configured to engage with a set of two or more wheels, and a second electric motor 162 that engages with at least one of the wheels to drive the continuous band. The second continuous track mechanism 164 is aligned in parallel with the first continuous track mechanism 154. The second continuous track drive sub-system 160 further comprises a second motor controller 161 coupled to the second electric motor 162. The second motor controller 161 provides electric power to the second electric motor 162 and controls the torque, rotational speed, and direction of rotation of the second electric motor 162. The electric motor 162 may go through a specific gear reduction to produce a defined track speed for each rotation. The second continuous track drive system 160 further includes a second rotation encoder 163 coupled to the second electric motor 162. The second rotation encoder 163 measures parameters such as the rotation and rotation rate of the second electric motor 162 and outputs a rotation signal (for example, a complex signal comprising in-phase and quadrature phase components) representing the rotational characteristics of the shaft of the electric motor 162 that drives operation of the second continuous track mechanism 164.

In some embodiments, the first rotation encoder 153 and the second rotation encoder 163 are each implemented by a sine encoder, also commonly referred to as a sine-cosine encoder. In other embodiments, the first rotation encoder 153 and the second rotation encoder 163 are instead each implemented by incremental encoders. As would be understood by one skilled in the art who has studied this disclosure, such rotation encoders 153, 163 supply information about the position, rotation rate, and direction of rotation, of the rotating shaft of the electric motors 152, 162 in the form of complex signals comprising digital signals or analog sine waves in quadrature. For example, the signals may be produced in response to pulses generated by a pickup device that monitors rotation of the motor shaft by observing the passing of a one or more marked shaft positions by either magnetic or optical means. As such, a single complete rotation of the motor shaft may produce a sinusoidal signal comprising a single cycle, or comprising multiple cycles.

As shown in FIG. 1, the vehicle steering control system 112 further comprises a main controller 120 coupled to the first motor controller 151 and the second motor controller 161, a phase and frequency decoder 140 configured to input the rotation signals generated by the first rotational encoder 153 and the second rotation encoder 163, and a human machine interface (HMI) 110 through which a user can enter inputs to control the direction of travel of the vehicle 100. In some embodiments, the HMI 110 may comprise a standard vehicle steering apparatus such as, but not limited to, a steering wheel, joystick, two stick control, or other steering apparatus. In other embodiments, the HMI 110 may comprise a keyboard or touch-screen display.

Figure 1A:
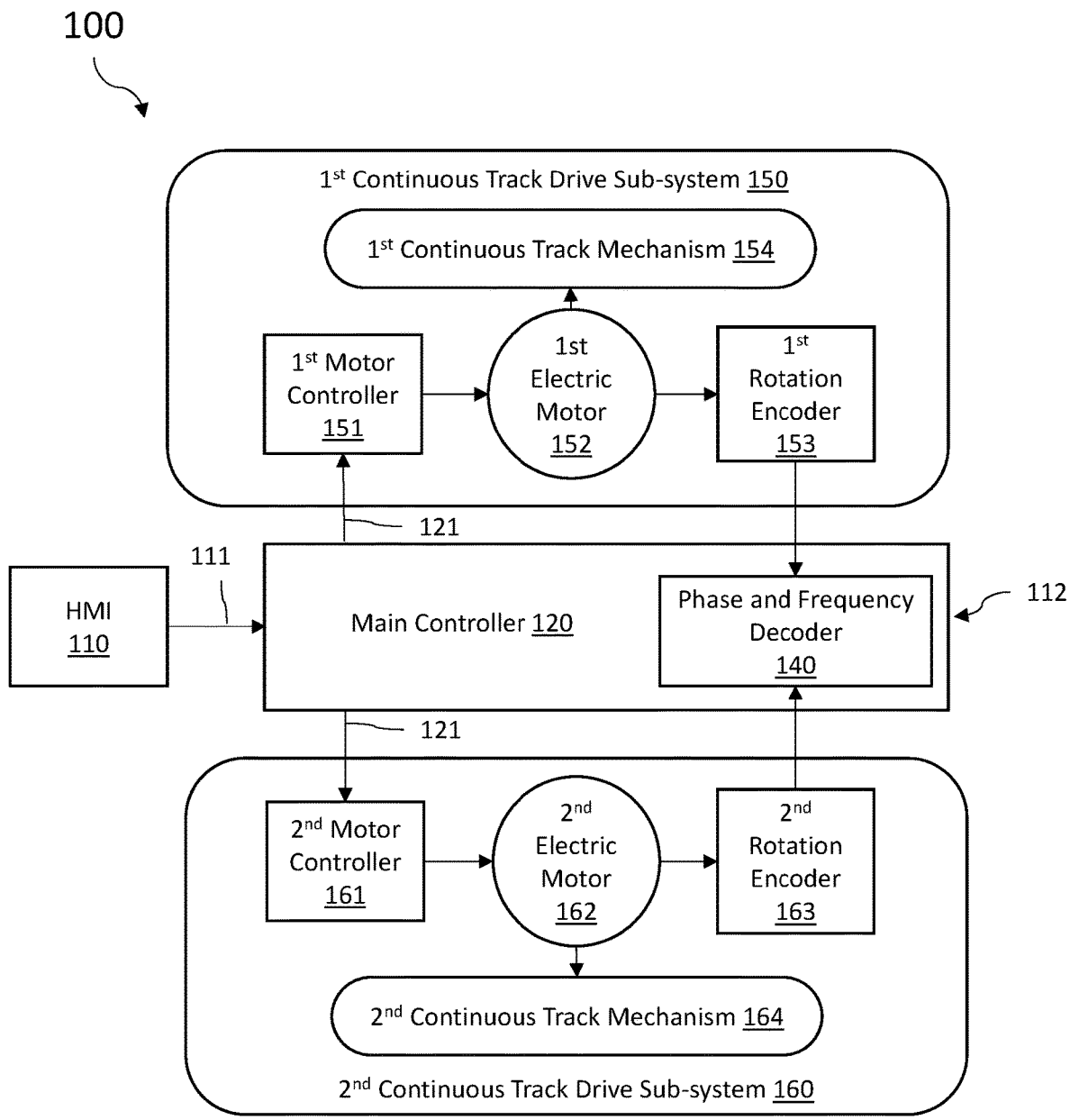
FIG. 1A is a block diagram illustrating an example track vehicle having an example alternate vehicle steering control system implementation.

In some embodiments, the phase and frequency decoder 140 may be implemented by a hardware or software frequency detector or phase detector. In some embodiments, as shown in FIG. 1A, the functions of the phase and frequency decoder 140 may be implemented by the main controller 120.

Figure 1B:
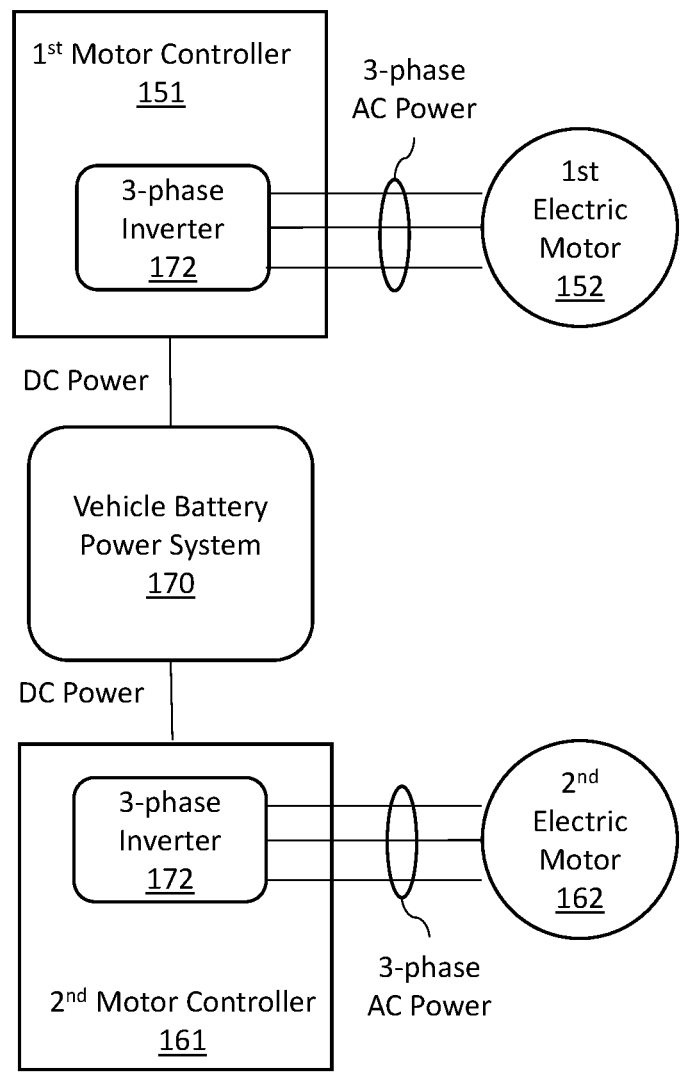
FIG. 1B is a block diagram illustrating an example track vehicle having an example vehicle battery power system for a vehicle steering control system.

As shown in FIG. 1B, the vehicle comprises a vehicle battery power system 170 that provides direct current (DC) electric power for operating various components of the track vehicle 100. For example, vehicle battery power system 170 may comprise one or more batteries. In some embodiments, the first electric motor 152 and the second electric motor 162 are both 3-phase alternating current (AC) permanent magnet (PM) electric motors, as shown in FIG. 1B. In such an embodiment, each of the motor controllers 151, 161, may each comprise a 3-phase inverter 172 that inputs the DC power from the vehicle battery power system 170 to produce a 3-phase AC electric power output for operating the electric motors 152, 162. It should be appreciated however that in other embodiments, single-phase AC motors or DC motors may instead be used to power the electric motors 152, 162.

In operation, as described more particularly below, the main controller 120 receives a steering control signal 111 from the HMI 110 that correspond to steering instruction inputs from a user of the vehicle 100. The user may be the pilot, driver, or other operator of the vehicle 100, or it may at least in part comprise an auto-pilot or computer assisted driving system. When the steering control signal 111 indicates that the vehicle 100 it to continue straight in its present direction of travel, the main controller 120 sends motor control signals 121 to the first and second motor controllers 151 and 162 to operate the first and second electric motors 152, 162 at the same rate of rotation. This rate of rotation will corresponding to a throttle input to the HMI 110 (or other input) from the user to control vehicle speed. In response, the first and second continuous track mechanisms 154, 164 will nominally be controlled to operate at the same speed so that the vehicle maintains its direction of travel. However, other factors may influence the operation of the first and second continuous track mechanisms 154, 164 such that the first and second electric motors 152, 162 in fact are not operating at the same rate of rotation. For example, differences in mechanical dimensions, tolerances, surface frictions, motor impedance differences, or other factors, may cause operational difference between the first and second continuous track mechanisms 154, 162 even when the first and second electric motors 152, 162 are driven with identical inputs. Similar difference in operation can occur due to differences in traction experienced due to traveling on a nonuniform ground surface or other terrain gradients. The greater vehicle speed, the greater degree such differences result in the vehicle deviating either left or right from straight in its direction of travel.

With embodiments of the present disclosure, when the steering control signal from the HMI 110 indicates that vehicle should go straight, the main controller 120 drives the first and second motor controllers 151 and 162 to adjust the speed of the first and second electric motors 152, 162 based on frequency and phase error signals produced from the phase and frequency decoder 140. The phase and frequency decoder 140 inputs the rotation signals from the rotation encoders 153 and 163 and in some embodiments further decodes a difference in frequency between the rotation of the first and second electric motors 152, 162 as well as a difference in phase, providing those differences to the main controller 120. In other embodiments, the phase and frequency decoder 140 decodes the phase and frequency information from the rotation encoders 153 and 163, and sends that data to the main controller 120 which then determines the difference in frequency between the rotation of the first and second electric motors 152, 162 as well as a difference in phase.

Because the electric motors 152, 162 are being driven to operate at the same speed, the detected frequency difference is expected to be very low and the detected phase difference will be the parameter that will dominate the error signal used to control the vehicle and keep it going straight. The main controller 120 individually adjusts the control signals 121 to the first motor controller 151 and the second motor controller 161 to drive the difference in frequency and phase measurements towards zero or at least to a value below a predetermined threshold. In this way, closed-loop control is implemented to ensure the first and second continuous track mechanisms 154, 164 are operating, to within an acceptable degree, at the same speed.

In contrast, when the HMI 110 receives an order from the user to execute a turn, the main controller 120 instead looks to drive the difference in frequencies to a specific difference that corresponds to a desired turn radius. That is, a measured difference in rotational frequency between the first and second electric motors 152, 162 can be processed to calculate an estimate of a turn angle or turn radius that is being executed by the vehicle. Consequently, by comparing that estimated turn angle or turn radius to the desired turn indicated by the user input to the HMI 110 a turn error can be determined and utilized to compute a correction for adjusting the speed difference between the electric motors 152, 162. For example, the main controller 120 may receive a user instruction from the HMI 110 to turn the vehicle left or right by a certain angle. The main controller 120 determines what difference in rotation speed between the first and second electric motors 152, 162 will cause the first and second continuous track mechanisms 154, 164 to operate at a speed differential to produce the desired turn, adjusts the motor speeds accordingly, and then monitors the frequency differential output from the phase and frequency decoder 140 for an indication of any turn error. The main controller drives the first and second electric motors 152, 162 so that the measured frequency difference matches the specified difference associated with the desired turn radius. In this way, closed-loop control is implemented to ensure the first and second continuous track mechanisms 154, 164 are operating, within an acceptable degree, to execute the desired turn.

Figure 2:
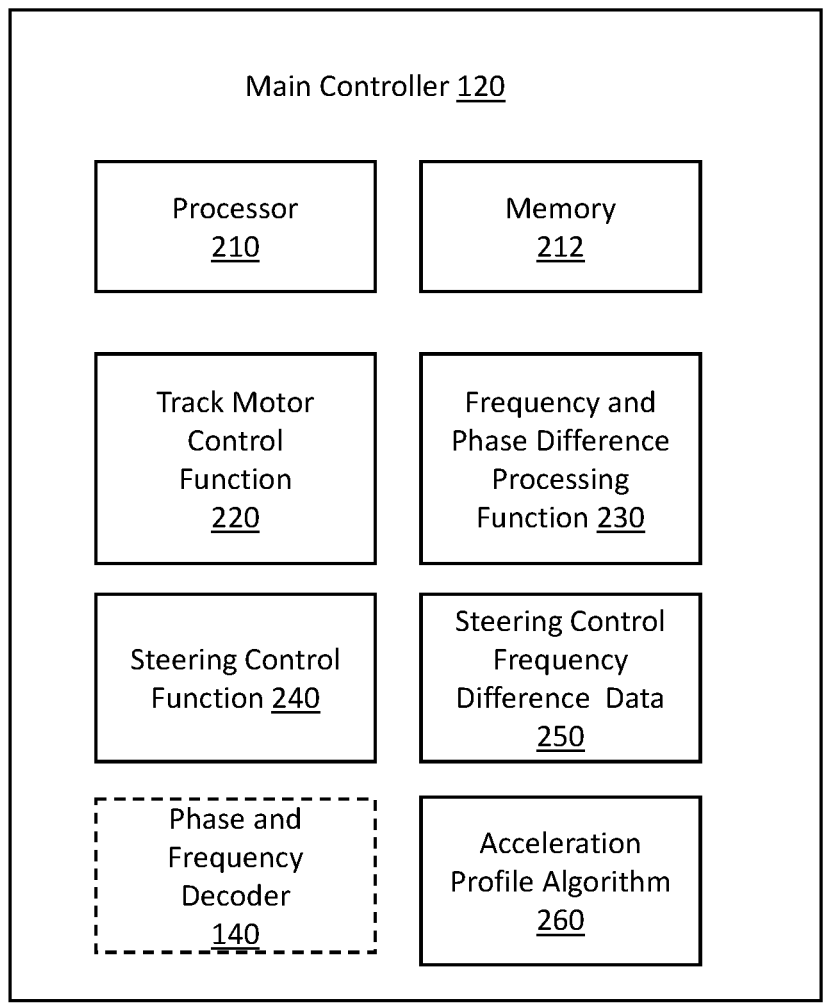
FIG. 2 is a block diagram illustrating an example main controller implementation for a vehicle steering control system.

FIG. 2 is a block diagram illustrating an example main controller 120 implementation for the vehicle steering control system 112 of the track vehicle 100. The main controller 120 comprises a processor 210 and memory 212 that are configured to execute code to implement one or more of the various functions of the main controller 120 as disclosed in the various embodiments described herein. In the embodiment shown in FIG. 2, the main controller 120 includes a track motor control function 220, a frequency and phase difference processing function 230, a track motor steering control function 240, and steering control frequency difference data 250.

The main controller 120 main also include one or more other algorithms executed by the processor 210 such as acceleration profile algorithm 260 to control vehicle acceleration and deceleration profiles. The acceleration profile algorithm 260 controls the speed of the electric motors 152, 162 via the track motor control function 220 and monitors changes in the measured motor frequency signals over time to follow a desired vehicle lineage acceleration or deceleration profile.

In operation, the steering control function 240 receives and interprets steering control signals received from the HMI 110, determining whether the user is instructing the vehicle to go straight or to turn, and if receiving instructions to turn, the angle and direction of the turn. The frequency and phase difference processing function 230 receives the frequency and phase information from the phase and frequency decoder 140 (which may optionally be a component of the main controller 120). In one embodiment, the frequency and phase difference processing function 230 inputs the information from the phase and frequency decoder 140, determines the differences in phase and frequency between the two electric motors 152 and 162 (including an identification of which motor leads or lags relative to the other), and determines an absolute frequency representing the vehicle's speed (for example, based on averaging the frequency signals from the two motors). The track motor control function 220 is configured to generate the control signals for operating the first and second motor controllers 151, 161 in response to signals from the steering control function 240.

For example, when the HMI 110 indicates that the vehicle 100 should go straight, the steering control function 240 will received the phase and frequency information from the frequency and phase difference processing function 230 and control the track motor control function 220 to produce control signals to the first and second motor controllers 151, 161 to drive the differences in phase and frequency values towards zero, or at least to a value below the predetermined threshold. In response, the vehicle 100 will go straight.

If instead the HMI 110 indicates that the vehicle 100 should turn the vehicle right or left by a specified angle, the steering control function 240 obtains from the steering control frequency difference data 250 a target frequency difference ($\Delta f_T$) in electric motor speeds to execute a turn in the specified direction and angle. The steering control function 240 executes a turning profile algorithm based on that frequency $\Delta f_T$ to instruct the track motor control function 220 to output motor control signals 121 to drive the electric motors 152, 162 to have that frequency difference, $\Delta f_T$, to perform a turn with the specific turn radius given the current vehicle speed. The difference between the two frequencies for the motors driving the continuous track mechanism 154, 164 divided by the frequency for a motor (e.g., $\Delta f_T/f_M$) can be used to compute a turn radius for each of the track mechanisms 154, 164. The outer radius track and the inner track are controlled by the steering control function 240 to maintain the desired vehicle speed while also maintaining a continuous drive to both of the tracks. At low speeds, the steering control function 240 may execute a turn by switching the direction of one of the tracks, such that one track drives forward and the other drives in reverse causing a zero-turn-radius on the vehicle. This change in direction may be implemented by either changing a gear reduction, or by reversing a motor's direction of rotation.

The target frequency difference, $\Delta f_T$, to execute the desired turn can be determined as a function of both the desired turn angle (and corresponding turn radius) and the current vehicle speed, and may be dynamically determined computationally in real time by the steering control function 240 or from frequency difference data stored, for example, in a lookup table. The steering control function 240 receives the phase and frequency information from the frequency and phase difference processing function 230 and controls the track motor control function 220 to produce control signals 121 to the first and second motor controllers 151, 161 to drive the differences in frequency values to the target frequency difference, or at least to within a predetermined threshold of the target frequency difference.

Figure 3:
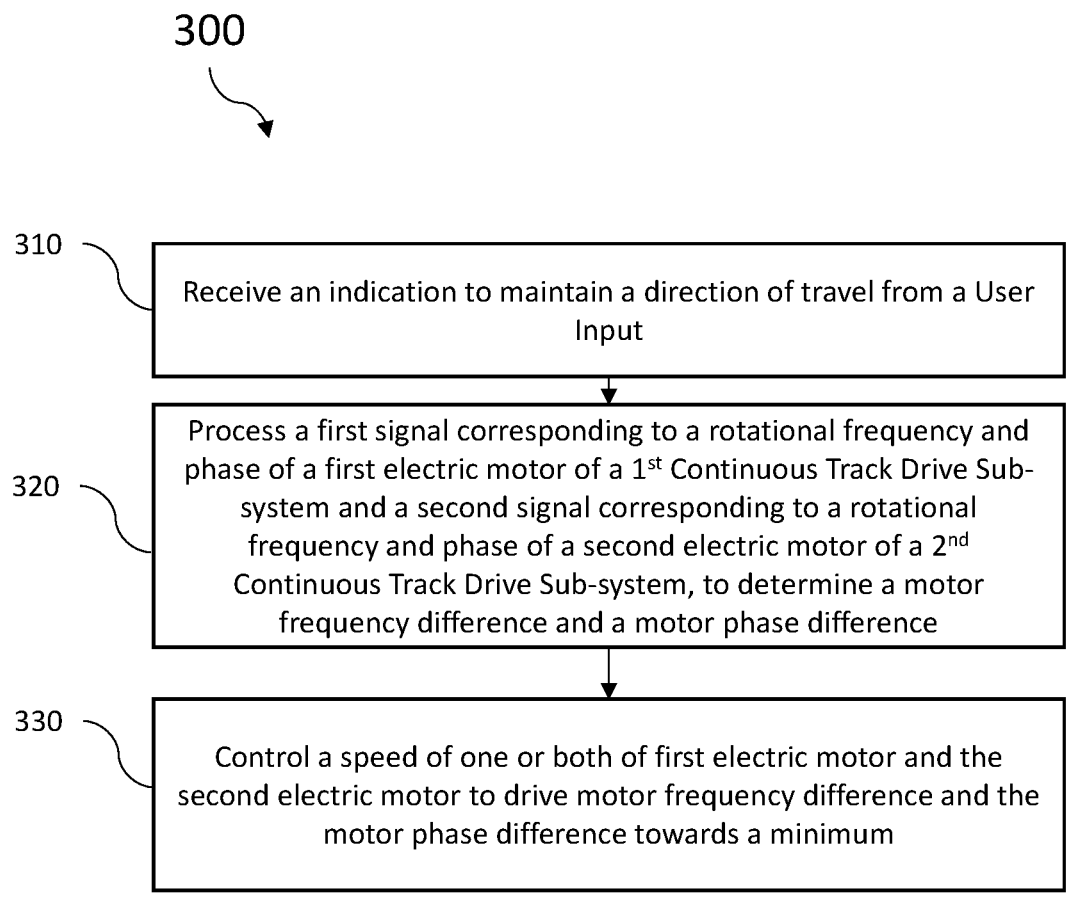
FIG. 3 is a flow chart illustrating an example method embodiment for vehicle steering control of a track vehicle.

FIG. 3 is a diagram of a method 300 which may be executed by the main controller 120 of vehicle 100, and more particularly by the motor steering control function 240, to control the operation of the first and second electric motors 152, 162 to maintain a straight direction of travel. It should be understood that the features and elements described herein with respect to the method 300 of FIG. 3 may be used in conjunction with, in combination with, or substituted for elements of any of the other embodiments discussed herein with respect to FIGS. 1 and 2 or other figures, and vice versa. Further, it should be understood that the functions, structures and other description of elements for embodiments described herein may apply to like or similarly named or described elements across any of the figures and/or embodiments describe therewith.

The method begins at 310 with receiving an indication to maintain a straight direction of travel from a user input. As discussed above the indication may comprise a signal from an HMI 110 such as joystick, steering wheel, or other steering apparatus operated by the driver of the vehicle 100, or from an auto-pilot or computer assisted driving system. The method proceeds to 320 with processing a first signal comprising rotational frequency and phase information for a first electric motor of the first continuous-track drive sub-system, and processing a second signal comprising rotational frequency and phase information for a second electric motor of a second continuous-track drive ub-system, to determine an error signal comprising a frequency difference and/or a phase difference. The method proceeds to 330 with controlling a speed of one or both of first electric motor and the second electric motor to drive frequency difference and the phase difference towards a minimum (e.g., to a value below a predetermined threshold). As discussed above, in this mode of operation where the vehicle is not executing a turn, the frequency difference should already be near zero and the phase error will be the dominant error. As such, the method 300 in some embodiments, may optionally omit considering the frequency differences.

Figure 4:
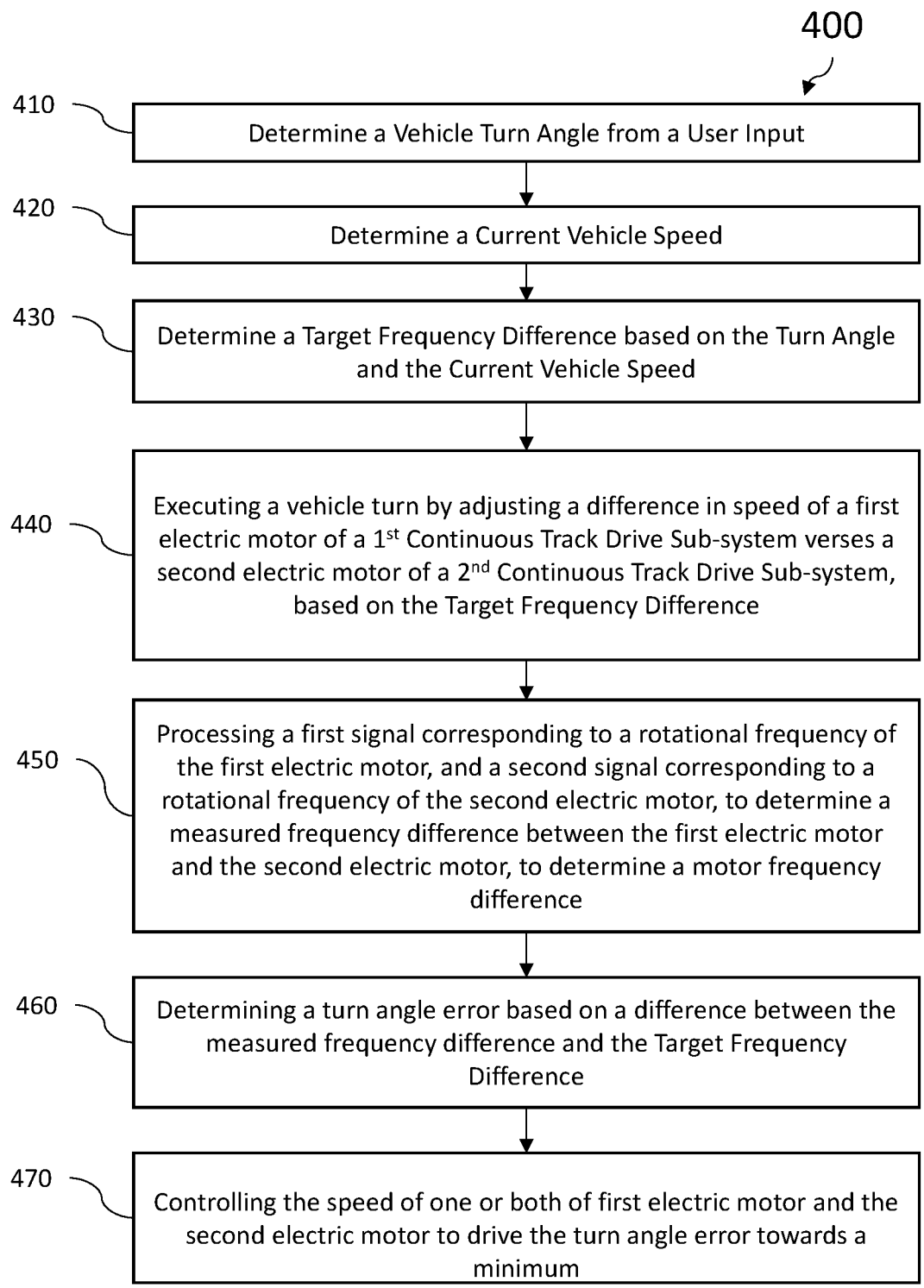
FIG. 4 is a flow chart illustrating another example method embodiment for vehicle steering control of a track vehicle.

FIG. 4 is a diagram of a method 400 which may be executed by the main controller 120 of vehicle 100, and more particularly by the motor steering control function 240, to control the operation of the first and second electric motors 152, 162 to execute a turn to change the direction of travel. It should be understood that the features and elements described herein with respect to the method 400 of FIG. 4 may be used in conjunction with, in combination with, or substituted for elements of any of the other embodiments discussed herein with respect to FIGS. 1 and 2 or other figures, and vice versa. Further, it should be understood that the functions, structures and other description of elements for embodiments described herein may apply to like or similarly named or described elements across any of the figures and/or embodiments describe therewith.

The method begins at 410 with determining a turn angle from a user input. As discussed above user input may comprise a signal from an HMI 110 such as joystick, steering wheel, or other steering apparatus operated by the driver of the vehicle 100, or from an auto-pilot or computer assisted driving system. The method proceeds to 420 to determine a current vehicle speed. For example, the current vehicle speed may be determined from a vehicle speedometer or other sensor, or computed from the frequency signals processed by the phase and frequency decoder 140.

The method then proceeds to 430 with determining a target frequency difference $\Delta f_T$ based on the turn angle and the current vehicle speed. As discussed above, the turn radius of an executed turn is a function of the difference in speed between the two tracks, and can be predicted by monitoring the difference in the electric motor rotational frequencies as measured by the rotation encoders 153, 163. It should also be appreciated that the turn radius is further a function of the each of the two electric motor absolute speeds, which can also be determined from the measured electric motor rotational rate frequencies. For example, a frequency difference of 500 Hz when the average frequency of the two motors is 5000 Hz will result in a larger turn radius than a frequency difference of 500 Hz when the average frequency of the two motors is only 2500 Hz.

Figure 4A:
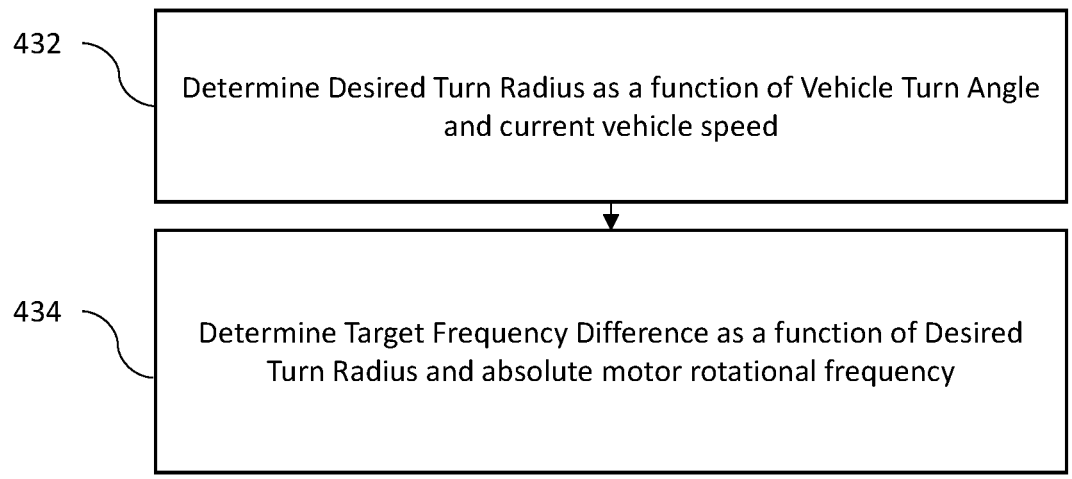
FIG. 4A is a flow chart illustrating a method for determining a target frequency difference for vehicle steering control of a track vehicle.

Accordingly, in one embodiment, the target frequency difference $\Delta f_T$ can be determined as illustrated in FIG. 4A. At 432, the method determines a desired turn radius as a function of desired turn angle (from the user input) and the current vehicle speed. In some embodiments, method when determining the desired turn radius may further access turn profile data that indicates what minimum turn radius the vehicle can safely execute at a given speed to avoid turn over or other vehicle instability. Then at 434, the method determines the target frequency difference as a function of desired turn radius and the current motor rotational frequencies for each of the electric motors.

Once the target frequency different determination is made, the method proceeds to 440 with executing a vehicle turn by controlling (based on the target frequency difference) a difference in the rotational speed of first electric motor for the first continuous track drive sub-system verses the rotational speed of the second electric motor of the second continuous track drive sub-system. This adjustment will produce a change in the speed of each track, causing the vehicle to turn.

However, as mentioned above, open-loop control will not likely result exactly in the turn desired by the user due to differences between the two track systems and other factors. To provide closed-loop control, the process proceeds to 450 with processing a first signal corresponding to a rotational frequency of the first electric motor, and a second signal corresponding to a rotational frequency of the second electric motor, to determine a measured frequency difference between the first electric motor and the second electric motor. The method proceeds to 460 with determining a turn angle error based on the difference between the measured frequency difference and the target frequency difference. The method then proceeds to 470 with controlling the speed of one or both of first electric motor and the second electric motor to drive the turn angle error towards a minimum.

Figure 5:
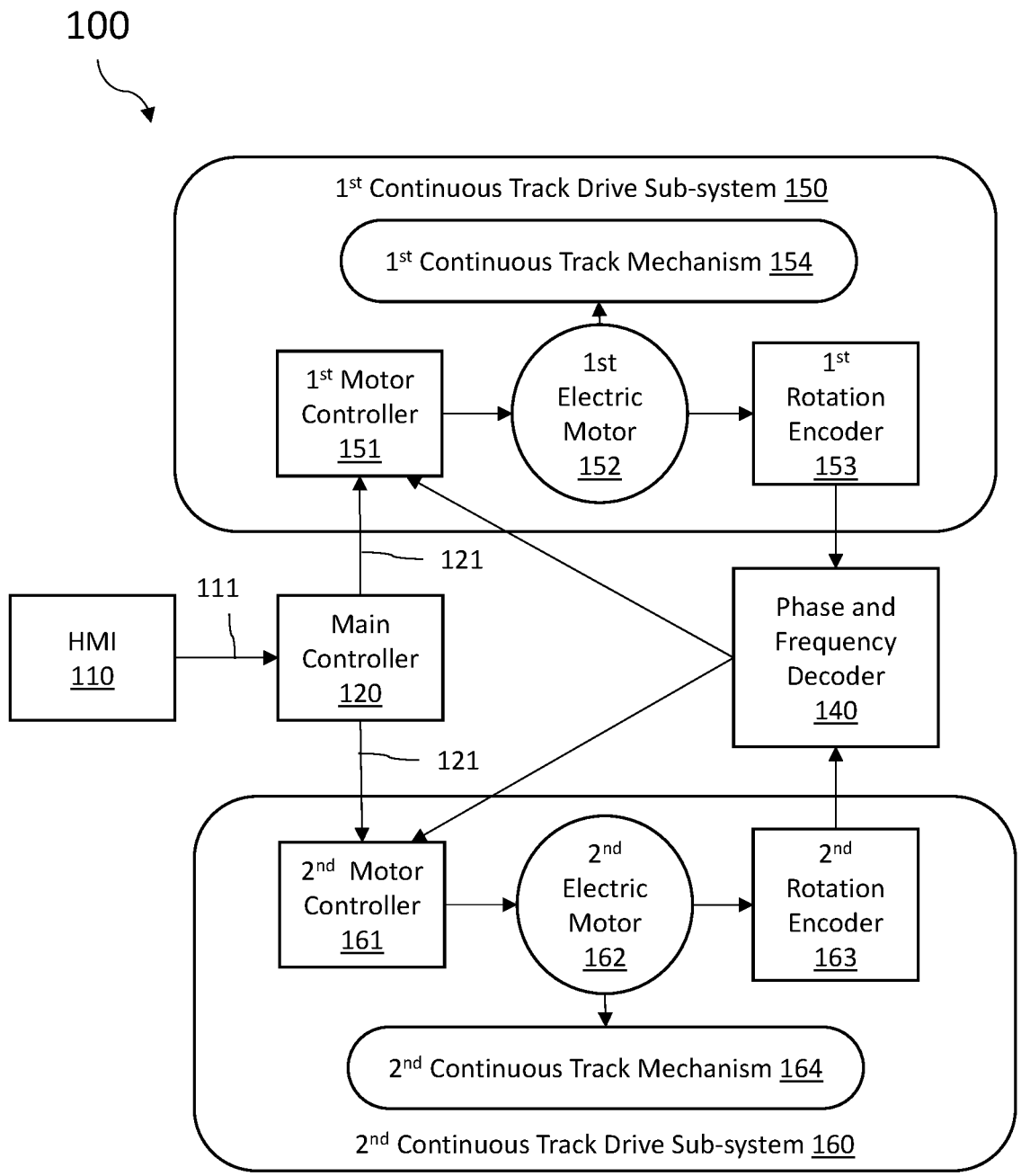
FIG. 5 is a block diagram illustrating an example track vehicle having an example alternate vehicle steering control system implementation.

It should be understood that in some embodiments, one or more of the functions described herein that are executed by the main controller 120 can instead be distributed between the main controller 120 and the first and second motor controllers 151, 161. For example as shown in FIG. 5, in one embodiment, the output from the phase and frequency decoder 140 may instead be directly supplied to the first and second motor controllers 151, 161 which then implement a local implementation of the motor steering control function 240 for operating and controlling the speed of their respective electric motor.

Example Embodiments

Example 1 includes a vehicle steering control system for a track vehicle, the system comprising: a first continuous track drive sub-system positioned on a first side of a track vehicle, the first continuous track drive sub-system comprising: a first continuous track mechanism, a first electric motor coupled to the first continuous track mechanism, a first motor controller coupled to the first electric motor, and a first rotation encoder coupled to the first electric motor; a second continuous track drive sub-system positioned on a second side of a track vehicle, the second continuous track drive sub-system comprising: a second continuous track mechanism aligned parallel to the first continuous track mechanism, a second electric motor coupled to the second continuous track mechanism, a second motor controller coupled to the second electric, and a second rotation encoder coupled to the second electric motor; a main controller configured to input a steering control signal; and a phase and frequency decoder coupled to the first rotation encoder and the second rotation encoder, wherein the phase and frequency decoder inputs a first rotation signal from the first rotation encoder representing a rotational frequency and phase of the first electric motor, wherein the phase and frequency decoder inputs a second rotation signal from the second rotation encoder representing a rotational frequency and phase of the second electric motor; wherein the main controller outputs motor control signals to the first motor controller and the second motor controller in response to the steering control signal and differences between the rotational frequency and phase for the first electric motor as represented by the first rotation signal and the rotational frequency and phase for the second electric motor as represented by the second rotation signal.

Example 2 includes the system of example 1, wherein the first rotation encoder and the second rotation encoded comprise one of a sine encoder or an incremental encoder; and wherein the first rotation signal and the second rotation signal are complex signals.

Example 3 includes the system of any one of examples 1-2, wherein the first electric motor and the second electric motor are alternating current (AC) permanent magnet (PM) electric motors.

Example 4 includes the system of example 3, wherein the first electric motor and the second electric motor are 3-phase AC electric motors; and wherein the first motor controller and the second motor controller each comprise 3-phase DC-to-AC electric power inverters.

Example 5 includes the system of any one of examples 1-4, wherein the phase and frequency decoder is implemented by the main controller.

Example 5 includes the system of any one of claims 1-5, wherein the main controller computes the differences between the rotational frequency and phase for the first electric motor and the rotational frequency and phase for the second electric motor based on inputs from the phase and frequency decoder.

Example 7 includes the system of any one of examples 1-6, wherein the phase and frequency decoder computes the differences between the rotational frequency and phase for the first electric motor and the rotational frequency and phase for the second electric motor.

Example 8 includes the system of example 7, wherein the phase and frequency decoder outputs the differences between the rotational frequency and phase for the first electric motor and the rotational frequency to the first motor controller and the second motor controller.

Example 9 includes the system of any one of example 1-8, wherein the main controller comprises: a processor coupled to a memory; a steering control function executed by the processor, wherein the steering control function receives and interprets the steering control signal; a track motor control function executed by the processor, wherein the track motor control function is configured to control the motor control signals to the first motor controller and the second motor controller in response to signals from the steering control function;

Example 10 includes the system example 9, the main controller further comprising a frequency and phase difference processing function; wherein the steering control function receives frequency and phase information from the frequency and phase difference processing function and controls the track motor control function to produce the motor control signals.

Example 11 includes a method for vehicle steering control of a track vehicle, the method comprising: receiving a steering control signal; inputting a first rotation signal from a first rotation encoder representing a rotational frequency and phase of a first electric motor, the first electric motor coupled to a first continuous track mechanism; inputting a second rotation signal from a second rotation encoder representing a rotational frequency and phase of a second electric motor, the second electric motor coupled to a second continuous track mechanism; and outputting motor control signals to a first motor controller and a second motor controller in response to the steering control signal and differences between the rotational frequency and phase for the first electric motor as represented by the first rotation signal and the rotational frequency and phase for the second electric motor as represented by the second rotation signal, wherein the first motor controller is coupled to the first electric motor and the second motor controller is coupled to the second electric motor.

Example 12 includes the method of example 11, further comprising: receiving via the steering control signal instructions to control the vehicle to travel straight; processing the first rotation signal and the second rotation signal, to determine an error in motor frequency difference and motor phase difference; and controlling a speed of one or both of first electric motor and the second electric motor to drive the error towards a minimum value.

Example 13 includes the method of any of examples 11-12, further comprising: receiving via the steering control signal instructions to turn vehicle; determining a turn angle from the steering control signal; determining a current vehicle speed; determining a target frequency difference based on the turn angle and the current vehicle speed; executing a vehicle turn by controlling a difference in rotational speed of the first electric motor verses rotational speed of the second electric motor based on the target frequency difference; processing the first rotation signal corresponding and the second rotation signal to determine a measured frequency difference between the first electric motor and the second electric motor; determining a turn angle error based on a difference between the measured frequency difference and the target frequency difference; controlling a speed of one or both of first electric motor and the second electric motor to drive the turn angle error towards a minimum value.

Example 14 includes the method of example 13, further comprising: determining a desired turn radius as a function of the turn angle and the current vehicle speed; and determining the target frequency difference as a function of the desired turn radius and an absolute motor rotational frequency.

Example 15 includes a vehicle steering control system for a track vehicle, the system comprising: a first continuous track drive sub-system positioned on a first side of a track vehicle, the first continuous track drive sub-system comprising: a first continuous track mechanism, a first electric motor coupled to the first continuous track mechanism, a first motor controller coupled to the first electric motor, and a first rotation encoder coupled to the first electric motor; a second continuous track drive sub-system positioned on a second side of a track vehicle, the second continuous track drive sub-system comprising: a second continuous track mechanism aligned parallel to the first continuous track mechanism, a second electric motor coupled to the second continuous track mechanism, a second motor controller coupled to the second electric, and a second rotation encoder coupled to the second electric motor; a main controller configured to input a steering control signal; and a phase and frequency decoder coupled to the first rotation encoder and the second rotation encoder, wherein the phase and frequency decoder inputs a first rotation signal from the first rotation encoder representing a rotational frequency and phase of the first electric motor, wherein the phase and frequency decoder inputs a second rotation signal from the second rotation encoder representing a rotational frequency and phase of the second electric motor; wherein the main controller outputs motor control signals to the first motor controller and the second motor controller in response to differences between the rotational frequency and phase for the first electric motor as represented by the first rotation signal and the rotational frequency and phase for the second electric motor as represented by the second rotation signal; wherein when the main controller receives instructions to control the vehicle to travel straight based on the steering control signal, the main controller controls the first motor controller and the second motor controller to drive an error signal between the rotational frequency and phase of the first electric motor and the rotational frequency and phase of the second motor to a minimum value.

Example 16 includes the system of example 15, wherein the minimum value is defined as a value below a predetermined threshold.

Example 17 includes a vehicle steering control system for a track vehicle, the system comprising: a first continuous track drive sub-system positioned on a first side of a track vehicle, the first continuous track drive sub-system comprising: a first continuous track mechanism, a first electric motor coupled to the first continuous track mechanism, a first motor controller coupled to the first electric motor, and a first rotation encoder coupled to the first electric motor; a second continuous track drive sub-system positioned on a second side of a track vehicle, the second continuous track drive sub-system comprising: a second continuous track mechanism aligned parallel to the first continuous track mechanism, a second electric motor coupled to the second continuous track mechanism, a second motor controller coupled to the second electric, and a second rotation encoder coupled to the second electric motor; a main controller configured to input a steering control signal; and a phase and frequency decoder coupled to the first rotation encoder and the second rotation encoder, wherein the phase and frequency decoder inputs a first rotation signal from the first rotation encoder representing a rotational frequency and phase of the first electric motor, wherein the phase and frequency decoder inputs a second rotation signal from the second rotation encoder representing a rotational frequency and phase of the second electric motor; wherein the main controller outputs motor control signals to the first motor controller and the second motor controller in response to differences between the rotational frequency and phase for the first electric motor as represented by the first rotation signal and the rotational frequency and phase for the second electric motor as represented by the second rotation signal; wherein when the main controller receives instructions to control the vehicle to turn based on the steering control signals, the main controller controls the first motor controller and the second motor controller to drive a frequency difference between the first motor and the second motor to a target frequency difference.

Example 18 includes the system of example 17, where the main controller determines the target frequency difference as a function of a turn radius determined from the steering control signal and a speed of the vehicle.

Example 19 includes the system of any of examples 17-18, where the main controller dynamically calculates the target frequency difference.

Example 20 includes the system of any of examples 17-19, where the main controller obtains the target frequency difference from a table stored in a memory.

In various alternative embodiments, system and/or device elements, method steps, or example implementations described throughout this disclosure (such as any of the main controller, motor controllers, rotation encoder, phase and frequency decoder, track motor control function, steering control function, acceleration profile algorithm, human machine interface, or any controllers, processors, circuits, or sub-parts thereof, for example) may be implemented at least in part using one or more computer systems, field programmable gate arrays (FPGAs), or similar devices comprising a processor coupled to a memory and executing code to realize those elements, processes, or examples, said code stored on a non-transient hardware data storage device. Therefore, other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

As used herein, terms such as main controller, motor controllers, rotation encoder, phase and frequency decoder, track motor control function, steering control function, acceleration profile algorithm, human machine interface, continuous track mechanisms, refer to the names of elements that would be understood by those of skill in the art of avionics industries and are not used herein as nonce words or nonce terms for the purpose of invoking 35 USC 112(f).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A vehicle steering control system for a track vehicle, the system comprising:
    a first continuous track drive sub-system positioned on a first side of a track vehicle, the first continuous track drive sub-system comprising: a first continuous track mechanism, a first electric motor coupled to the first continuous track mechanism, a first motor controller coupled to the first electric motor, and a first rotation encoder coupled to the first electric motor;
    a second continuous track drive sub-system positioned on a second side of a track vehicle, the second continuous track drive sub-system comprising: a second continuous track mechanism aligned parallel to the first continuous track mechanism, a second electric motor coupled to the second continuous track mechanism, a second motor controller coupled to the second electric, and a second rotation encoder coupled to the second electric motor;
    a main controller configured to input a steering control signal; and
    a phase and frequency decoder coupled to the first rotation encoder and the second rotation encoder, wherein the phase and frequency decoder inputs a first rotation signal from the first rotation encoder representing a rotational frequency and phase of the first electric motor, wherein the phase and frequency decoder inputs a second rotation signal from the second rotation encoder representing a rotational frequency and phase of the second electric motor;
    wherein the main controller outputs motor control signals to the first motor controller and the second motor controller in response to the steering control signal and monitored differences between the first rotation signal and the second rotation signal to drive the monitored differences below a threshold.

2. The system of claim 1, wherein the first rotation encoder and the second rotation encoded comprise one of a sine encoder or an incremental encoder; and
    wherein the first rotation signal and the second rotation signal are complex signals.

3. The system of claim 1, wherein the first electric motor and the second electric motor are alternating current (AC) permanent magnet (PM) electric motors.

4. The system of claim 3, wherein the first electric motor and the second electric motor are 3-phase AC electric motors; and
    wherein the first motor controller and the second motor controller each comprise 3-phase DC-to-AC electric power inverters.

5. The system of claim 1, wherein the phase and frequency decoder is implemented by the main controller.

6. The system of claim 1, wherein the main controller computes the differences between the rotational frequency and phase for the first electric motor and the rotational frequency and phase for the second electric motor based on inputs from the phase and frequency decoder.

7. The system of claim 1, wherein the phase and frequency decoder computes the differences between the rotational frequency and phase for the first electric motor and the rotational frequency and phase for the second electric motor.

8. The system of claim 7, wherein the phase and frequency decoder outputs the differences between the rotational frequency and phase for the first electric motor and the rotational frequency to the first motor controller and the second motor controller.

9. The system of claim 1, wherein the main controller comprises:
    a processor coupled to a memory;
    a steering control function executed by the processor, wherein the steering control function receives and interprets the steering control signal;
    a track motor control function executed by the processor, wherein the track motor control function is configured to control the motor control signals to the first motor controller and the second motor controller in response to signals from the steering control function.

10. The system of claim 9, the main controller further comprising a frequency and phase difference processing function;
    wherein the steering control function receives frequency and phase information from the frequency and phase difference processing function and controls the track motor control function to produce the motor control signals.

11. A method for vehicle steering control of a track vehicle, the method comprising:
    receiving a steering control signal;
    inputting a first rotation signal from a first rotation encoder representing a rotational frequency and phase of a first electric motor, the first electric motor coupled to a first continuous track mechanism;
    inputting a second rotation signal from a second rotation encoder representing a rotational frequency and phase of a second electric motor, the second electric motor coupled to a second continuous track mechanism; and
    outputting motor control signals to a first motor controller and a second motor controller in response to the steering control signal and monitored differences between the first rotation signal and the second rotation signal to drive the monitored differences below a threshold, wherein the first motor controller is coupled to the first electric motor and the second motor controller is coupled to the second electric motor.

12. The method of claim 11, further comprising:
    receiving via the steering control signal instructions to control the vehicle to travel straight;
    processing the first rotation signal and the second rotation signal, to determine an error in motor frequency difference and motor phase difference; and controlling a speed of one or both of first electric motor and the second electric motor to drive the error towards a minimum value.

13. The method of claim 11, further comprising:
receiving via the steering control signal instructions to turn vehicle;
determining a turn angle from the steering control signal;
determining a current vehicle speed;
determining a target frequency difference based on the turn angle and the current vehicle speed;
executing a vehicle turn by controlling a difference in rotational speed of the first electric motor verses rotational speed of the second electric motor based on the target frequency difference;
processing the first rotation signal corresponding and the second rotation signal to determine a measured frequency difference between the first electric motor and the second electric motor;
determining a turn angle error based on a difference between the measured frequency difference and the target frequency difference;
controlling a speed of one or both of first electric motor and the second electric motor to drive the turn angle error towards a minimum value.

14. The method of claim 13, further comprising:
determining a desired turn radius as a function of the turn angle and the current vehicle speed; and
determining the target frequency difference as a function of the desired turn radius and an absolute motor rotational frequency.

15. A vehicle steering control system for a track vehicle, the system comprising:
a first continuous track drive sub-system positioned on a first side of a track vehicle, the first continuous track drive sub-system comprising: a first continuous track mechanism, a first electric motor coupled to the first continuous track mechanism, a first motor controller coupled to the first electric motor, and a first rotation encoder coupled to the first electric motor;
a second continuous track drive sub-system positioned on a second side of a track vehicle, the second continuous track drive sub-system comprising: a second continuous track mechanism aligned parallel to the first continuous track mechanism, a second electric motor coupled to the second continuous track mechanism, a second motor controller coupled to the second electric, and a second rotation encoder coupled to the second electric motor;
a main controller configured to input a steering control signal; and
a phase and frequency decoder coupled to the first rotation encoder and the second rotation encoder, wherein the phase and frequency decoder inputs a first rotation signal from the first rotation encoder representing a rotational frequency and phase of the first electric motor, wherein the phase and frequency decoder inputs a second rotation signal from the second rotation encoder representing a rotational frequency and phase of the second electric motor;
wherein the main controller outputs motor control signals to the first motor controller and the second motor controller in response to differences between the rotational frequency and phase for the first electric motor as represented by the first rotation signal and the rotational frequency and phase for the second electric motor as represented by the second rotation signal;
wherein when the main controller receives instructions to control the vehicle to travel straight based on the steering control signal, the main controller controls the first motor controller and the second motor controller to drive an error signal between the rotational frequency and phase of the first electric motor and the rotational frequency and phase of the second motor to a minimum value.

16. The system of claim 15, wherein the minimum value is defined as a value below a predetermined threshold.

17. A vehicle steering control system for a track vehicle, the system comprising:
a first continuous track drive sub-system positioned on a first side of a track vehicle, the first continuous track drive sub-system comprising: a first continuous track mechanism, a first electric motor coupled to the first continuous track mechanism, a first motor controller coupled to the first electric motor, and a first rotation encoder coupled to the first electric motor;
a second continuous track drive sub-system positioned on a second side of a track vehicle, the second continuous track drive sub-system comprising: a second continuous track mechanism aligned parallel to the first continuous track mechanism, a second electric motor coupled to the second continuous track mechanism, a second motor controller coupled to the second electric, and a second rotation encoder coupled to the second electric motor;
a main controller configured to input a steering control signal; and
a phase and frequency decoder coupled to the first rotation encoder and the second rotation encoder, wherein the phase and frequency decoder inputs a first rotation signal from the first rotation encoder representing a rotational frequency and phase of the first electric motor, wherein the phase and frequency decoder inputs a second rotation signal from the second rotation encoder representing a rotational frequency and phase of the second electric motor;
wherein the main controller outputs motor control signals to the first motor controller and the second motor controller in response to differences between the rotational frequency and phase for the first electric motor as represented by the first rotation signal and the rotational frequency and phase for the second electric motor as represented by the second rotation signal;
wherein when the main controller receives instructions to control the vehicle to turn based on the steering control signals, the main controller controls the first motor controller and the second motor controller to drive a frequency difference between the first motor and the second motor to a target frequency difference.

18. The system of claim 17, where the main controller determines the target frequency difference as a function of a turn radius determined from the steering control signal and a speed of the vehicle.

19. The system of claim 17, where the main controller dynamically calculates the target frequency difference.

20. The system of claim 17, where the main controller obtains the target frequency difference from a table stored in a memory.

* * * * *